United States Patent [19]
Riehle

[11] 4,148,148
[45] Apr. 10, 1979

[54] PLANNING BOARD

[76] Inventor: Harald Riehle, Anna-Schieber-Weg 18, 7300 Esslingen, Fed. Rep. of Germany

[21] Appl. No.: 790,626

[22] Filed: Apr. 25, 1977

[30] Foreign Application Priority Data

Apr. 27, 1976 [DE] Fed. Rep. of Germany ....... 2618325

[51] Int. Cl.² ............................................. G09F 7/12
[52] U.S. Cl. .................................................... 40/594
[58] Field of Search ..................... 40/125 A, 124, 594; 273/136 G, 136 GB

[56] References Cited

U.S. PATENT DOCUMENTS

| | | | |
|---|---|---|---|
| 2,586,009 | 2/1952 | Dickey | 40/125 A X |
| 2,586,017 | 2/1952 | Freedman | 40/125 A X |
| 3,299,556 | 1/1967 | Stiefel | 40/125 A X |
| 3,827,170 | 8/1974 | Lau | 40/158 R |

FOREIGN PATENT DOCUMENTS 730524  5/1955  United Kingdom .................... 40/10 R

*Primary Examiner*—Russell R. Kinsey
*Assistant Examiner*—Wenceslao J. Contreras
*Attorney, Agent, or Firm*—Edwin E. Greigg

[57] ABSTRACT

In a planning board of the kind having a foil surface adapted to have planning symbols attached thereto by a self-adherent effect, this effect being also utilized for the purpose of assembling the planning board from individual board elements. For this purpose, each element has a smooth surface at least along a margin of its reverse side so that it may be attached self-adherently to the surface of another like element. The resulting planning board can be folded like a book, e.g. for accommodation in a briefcase and provision may also be made for attaching it to a wall-mounted strip by the same self-adherent effect. Provision may also be made for the planning board to accommodate a card strip (e.g. bearing a notice) between two foil surfaces making up the planning board.

12 Claims, 8 Drawing Figures

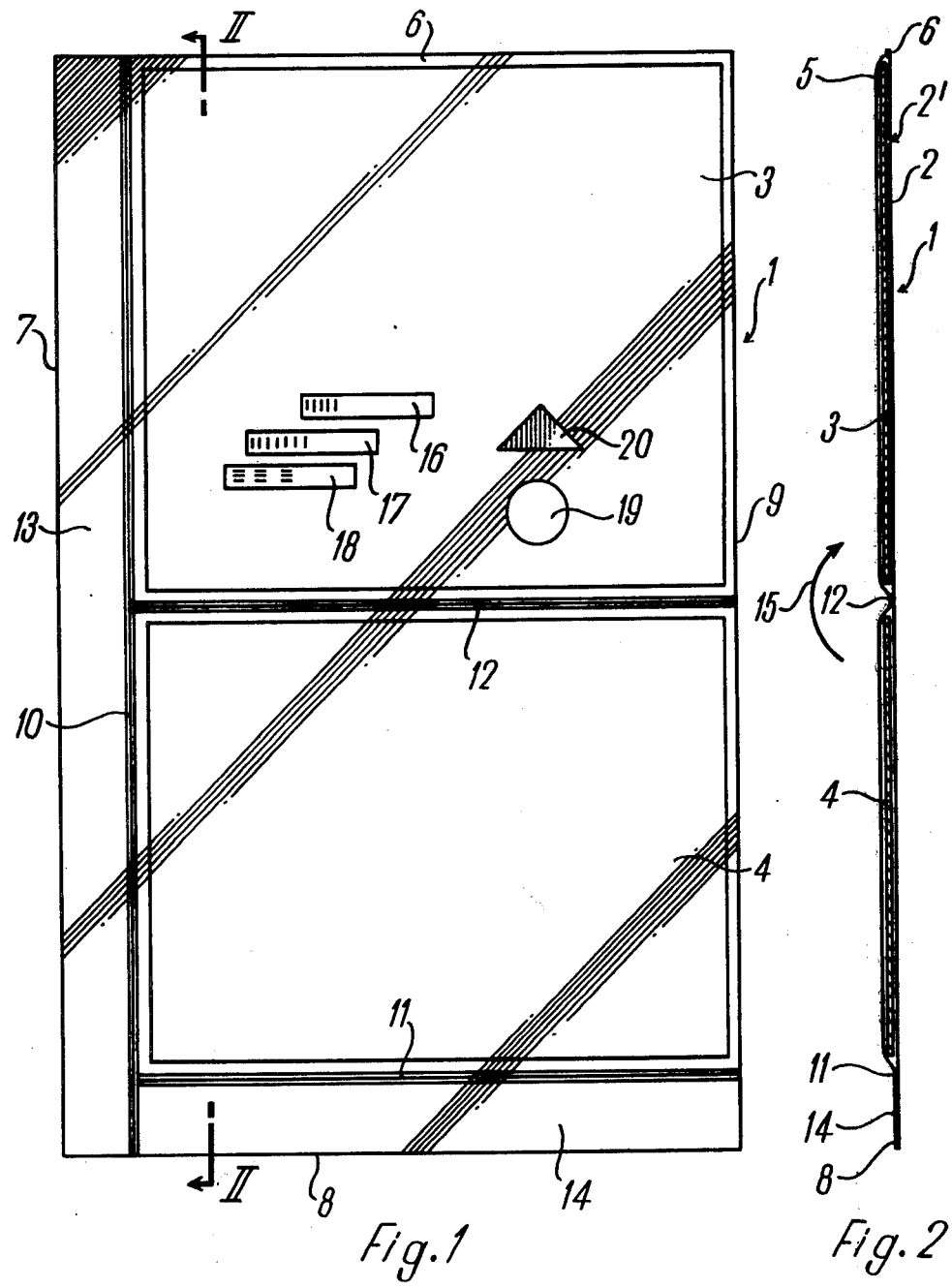

PLANNING BOARD

This invention relates to a planning board of the kind having a surface formed by a soft self-adherent foil, on to which planning symbols having a smooth rear surface can be pressed in such a way that they adhere thereto by reason of the self-adherent forces created thereby.

Planning boards of this kind are known (German Pat. Specification No. 845 441; 1 179 095). These planning boards, as do other planning boards, present the problem that they take up a lot of room and are not readily transportable. The same applies to the so called "flip-charts" or metal demonstration boards in connection with which magnetic planning symbols are used.

The object of the invention is to create a planning board which is adapted to be assembled from parts which take up little room, which however form a firm surface to which a planning symbol can be applied, the individual parts being easily and simply assembled.

According to the invention, this object is fulfilled by a planning board of the aforesaid kind which is adapted to be assembled from a plurality of planning board elements, each said element also comprising a surface which is smooth along at least a margin of its reverse side, such that the element is adapted to be pressed on to the smooth foil forming the surface of another planning board element so as to adhere thereto.

It is thus proposed, in accordance with the invention, to utilise a self-adherent effect which serves the purpose of adhering the planning symbols to the board, for the purpose of assembling the planning boards from individual planning board elements.

The invention further encompasses several advantageous additional features. Examples of embodiments of the invention and their advantageous further developments will now be described with reference to the accompanying drawings, in which:

FIG. 1 is a plan view of a planning board element;

FIG. 2 is a cross-section along the line II—II in FIG. 1;

Figures 3, 4, 5:
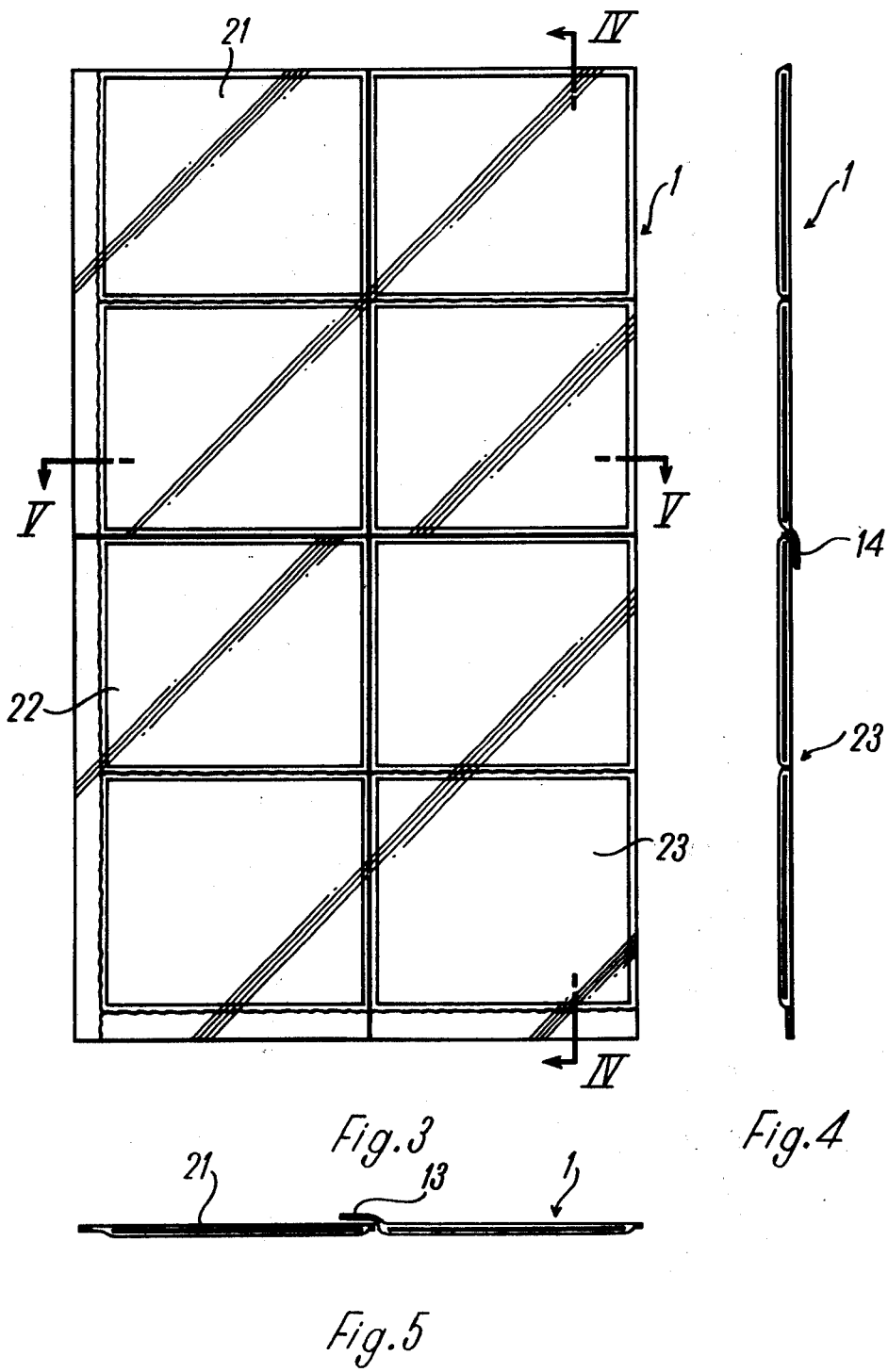
FIG. 3 is a plan view of a planning board made up of four planning board elements.
FIG. 4 is a section along the line IV—IV in FIG. 3.
FIG. 5 is a section along the line V—V in FIG. 3.

FIGS. 1 and 2 show a planning board element 1 used to form a planning board assembled from a plurality of such planning board elements. The reverse side is formed by a soft lacquered foil 2, which has a smooth rear surface 2'. Two cardboard elements 3 and 4 lie on the foil 2. An extremely soft self-adherent foil 5 is provided over the elements 3,4 and is welded thereto along the margins 6, 7, 8 and 9. Moreover, strip-like lips 13 and 14 respectively are defined by the weld seams 10 and 11 on the left hand and lower margin respectively in FIG. 1. The planning board element is divided at the centre by the weld seam 12. The cardboard element 3 is disposed between the margins 6, 9 and the weld seams 10, 12, and the cardboard element 4 is disposed between the margin 9 and the weld seams 10, 11, 12. In the locality of the weld seam 12, substantially in the middle of the overall planning board element 1, the two halves, which substantially correspond to the cardboard elements 3, 4 respectively, can be closed up like a book in the direction of the arrow 15.

The foil 5 is an extremely soft PVC foil. Numeric planning symbols 16 to 20 of relatively rigid material, e.g. hard PVC or cardboard coated on the reverse side thereof, i.e. having a smooth, though not so soft, rear surface, adhere to the foil 5 after being pressed onto it by reason of the self-adhering forces created between the two faces which have been pressed together. This is possible because, when the two surfaces are pressed together, both of which are very smooth and at least one of which is capable of clinging strongly against the other when pressed on to it, the air completely escapes from the space therebetween and this condition remains in existence.

The reverse surface of the planning board element 1 with the high-gloss and extremely smooth surface 2' of the lacquered foil 2 also in turn adheres to the foil 5 when pressed thereagainst. In accordance with the invention as can be seen from FIGS. 3 and 4, for the purpose of assembling a planning board from a plurality of planning board elements 1, 21, 22, 23, the reverse side of the right hand margin of the planning board element 21 is pressed on to the left hand lip 13 of the planning board element 1 and self-adheres thereto. The reverse side of the upper margin of the planning board element 23 is pressed on to the lower lip 14 of the planning board element 1 and adheres thereto. Likewise the upper margin of the planning board element 22 is pressed on to the lower (not visible) lip of the planning board element 21 and the right margin of the planning board element 22 on to the (not visible) left hand lip of the planning board element 23. By self-adhering of the margins or margin of a planning board element to another planning board element or to a lip provided on another planning board element, a single large planning board is thus produced. The planning board is, by a rapid assembly operation, readily assembled from the individual planning board elements, since the reverse sides of the margins of one of the planning board elements may be merely pressed against the lips on the other planning board elements. If the planning board elements have no lips, the margins are simply pressed together. The lips however provide a uniform appearance of the overall area of the assembled planning board. The planning board is just as readily disassembled, since the individual planning board elements can be closed up along the weld seam 12 to define a format which is only insignificantly larger than the section of a cardboard element 3, the individual parts also take up very little room and are therefore readily accommodated in, for example, a briefcase or sample case.

The entire planning board, as shown in FIG. 3, is interrupted only by the weld seam and the margins of the individual planning board elements. In FIGS. 1 and 3 this is exaggerated for the purpose of showing the constructional design. In actual fact there is created, in a technically very simple manner, a large area 5, having one surface to which planning symbols having a smooth rear surface readily adhere by being pressed on to it.

The hard foil is washable, so that it can be inscribed by means of water-soluble crayons. It is also possible to inscribe them with permanently colouring pens, the inscription produced thereby being again erasable by means of special foil erasers, known per se.

Figure 6:
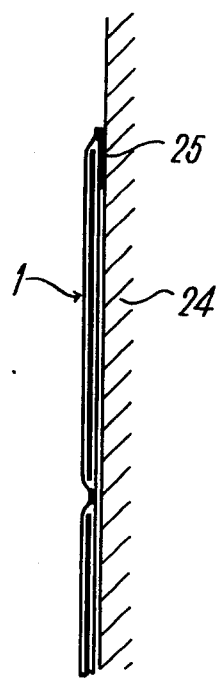
FIG. 6 shows the attachment of a planning board element to a wall.

FIG. 6 shows a simple form of attachment of the planning board to a wall 24. To the wall 24 an adhesive foil strip 25 is adhesively fixed, i.e. a strip of a foil which is adhesive on one side and known per se. It can be pulled off again at any time. The smooth surface of the adhesive foil strip 25 faces away from the wall. On it, the margin of the reverse side of the planning board element adheres after being simply pressed on to it. Thus for example a planning board having the dimensions 1.5 m × 1.0 m can be readily and rapidly assembled in a simple manner from four planning board elements and secured to a wall by means of an adhesive foil strip 25.

Figure 7:
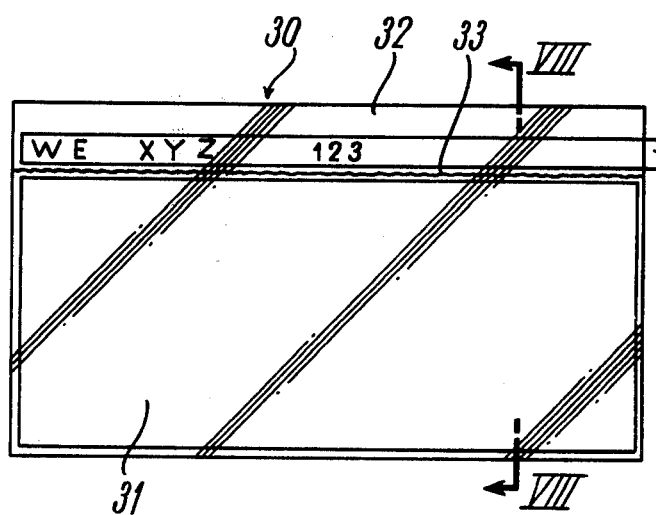
FIG. 7 is a further exemplary embodiment.
Figure 8:
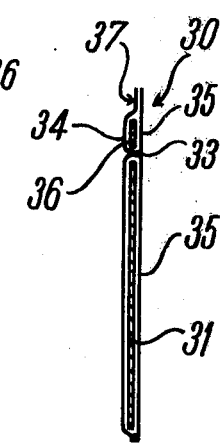
FIG. 8 is a section along the line VIII—VIII in FIG. 7.

FIG. 7 shows a planning board element 30 having a cardboard element 31 inserted therein, to the upper side of which, above the weld seam 33, a strip 32 is provided, which is open at its upper margin, i.e. at which the smooth-surfaced foil 34 forming the front is not welded to the lacquered foil 35 forming the rear. The foil 34 and the lacquered foil 35 can thus be separated, so that an inscribed paper strip 36, which is narrower than the strip 32, can be inserted between the foils 34 and 35. The paper strip then adheres on the inside of the self-adherent foil 34 and the adjacent surfaces of the foils 34, 35, in the upper region 37 which is not taken up by the paper strip 36, may be adhered together. Thus a head fillet, protected from dust, is created for the planning board element 30. If, as has already been mentioned, the foils 5 and 34 respectively are transparent, the cardboard elements 3, 4, 31 may, for example, have a grid printed thereon.

If, in lieu of the lacquered foils 2 and 35 respectively, a transparent foil is used, and also in lieu of the cardboard element 3, 4, 31 transparent inserts are used, which endow the planning board element with the necessary rigidity, and if in lieu of the cardboard elements, transparent planning symbols, which are inscribed or printed, are used, then the planning board with planning symbols can be inserted in an overhead projector and the representation can be projected.

As has already been mentioned, the foils used are made of materials known per se and commercially available. The two surfaces which adhere together have to be smooth and at least one of them has to be so flexible that a self-adhering effect results when they are pressed on to each other. This effect is utilised for causing the planning symbols to adhere to the foil surface and moreover, in accordance with the invention, for causing the lacquered foil 2 to adhere to the self-adherent foil 5 on the upper side of one of the lips 1 or 14. It is also utilised for causing the lacquered foil 35 to adhere to the foil strip 25.

I claim:

1. A planning board comprising, in combination, a plurality of substantially planar planning board elements each having a front surface and a rear surface, said front surface formed by a soft, smooth foil having the property of detachably adhering by vacuum forces to a similar smooth surface pressed thereon by adherent interaction between the overlying surfaces, said rear surface having a smooth surface along at least a marginal portion to permit two or more planning board elements to be detachably interconnected in mutually adhering engagement by pressing together in overlying relationship said smooth marginal portion on one planning board element and a corresponding portion of the foil surface on another element to form a planning board from said plurality of planning board elements.

2. A planning board according to claim 1, wherein the soft smooth foil is washable.

3. A planning board according to claim 1, wherein said elements are in the form of cardboard elements which are covered by said soft, smooth foil.

4. A planning board according to claim 1, wherein said elements can each be closed up like a book along a line extending substantially centrally of the element.

5. A planning board in accordance with claim 1, wherein each of said planning board elements is provided with a marginal lip along at least two adjoining sides thereof to serve as self-adhering portions on said planning board elements to secure said planning board elements together, said self-adhering marginal lips being disposed adjacent the surface of said planning board element to which a plurality of planning symbols may be detachably applied in a self-adhering manner.

6. A planning board according to claim 5, wherein the marginal lips are formed by a region which is covered by said soft, smooth foil and which is bounded by weld seams.

7. A planning board according to claim 6, wherein a strip is provided adjacent the region which is covered by said soft, smooth foil and adapted to have planning symbols pressed thereonto, the strip being formed by a first and a second said foil, said foils separably adhering together in such a manner as to enable a paper strip to be insertable therebetween.

8. A planning board according to claim 7 wherein said foils which form the strip are bounded by a weld seam.

9. A planning board in accordance with claim 5 wherein said marginal lips are formed on each of said planning board elements along adjacent marginal edge portions defining the length and width of said planning board element.

10. A planning board in accordance with claim 5 wherein said marginal lips extend throughout an area on said planning board element front surface and a longitudinally and transversely extending weld seam on said planning board element for separating the area of said marginal lips from the remaining surface portion of said planning board element.

11. A planning board in accordance with claim 1 including a foil strip having an adhesive on one surface and having a smooth other surface for self-adhering engagement with the rear surface of one of said planning board elements.

12. A planning board in accordance with claim 1 wherein at least one of said planning board elements is provided with an opening between said front and rear surfaces along one marginal edge and a strip removably positioned within said opening adjacent said marginal edge.

* * * * *